(12) United States Patent
Keralapura et al.

(10) Patent No.: US 8,819,227 B1
(45) Date of Patent: Aug. 26, 2014

(54) DISCERNING WEB CONTENT AND SERVICES BASED ON REAL-TIME DNS TAGGING

(75) Inventors: Ram Keralapura, San Jose, CA (US); Marco Mellia, Turin (IT); Ignacio Bermudez, Astoria, NY (US); Antonio Nucci, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 264 days.

(21) Appl. No.: 13/423,564

(22) Filed: Mar. 19, 2012

(51) Int. Cl.
*G06F 15/16* (2006.01)

(52) U.S. Cl.
USPC .......................................... 709/224; 709/203

(58) Field of Classification Search
None
See application file for complete search history.

(56) References Cited

U.S. PATENT DOCUMENTS

| | | | | |
|---|---|---|---|---|
| 8,621,556 | B1* | 12/2013 | Bharali et al. .................... 726/1 |
| 2003/0154306 | A1* | 8/2003 | Perry ............................ 709/245 |
| 2004/0215707 | A1* | 10/2004 | Fujita et al. .................... 709/201 |
| 2005/0022008 | A1* | 1/2005 | Goodman et al. ............ 713/201 |
| 2008/0008183 | A1* | 1/2008 | Takagaki et al. .............. 370/392 |
| 2008/0059346 | A1* | 3/2008 | Schweitzer et al. ............ 705/30 |
| 2008/0159312 | A1* | 7/2008 | Tuononen et al. ............ 370/401 |
| 2009/0013210 | A1* | 1/2009 | McIntosh et al. ................... 714/4 |
| 2009/0077383 | A1* | 3/2009 | de Monseignat et al. ..... 713/175 |
| 2009/0156253 | A1* | 6/2009 | Shi et al. ......................... 455/558 |
| 2009/0172138 | A1* | 7/2009 | Wang et al. .................... 709/223 |
| 2010/0208742 | A1* | 8/2010 | Kafle et al. .................... 370/401 |
| 2012/0278889 | A1* | 11/2012 | El-Moussa ....................... 726/23 |

OTHER PUBLICATIONS

Huang, Cheng, et al., "Measuring and Evaluating Large-Scale CDNs", IMC'08: Proceedings of the 8th ACM SIGCOMM Conference on Internet Measurement, 2008, pp. 15-29.
Choi, Hyunsang, et al., "Botnet Detection by Monitoring Group Activities in DNS Traffic", CIT '07 Proceedings of the 7th IEEE International Conference on Computer and Information Technology, 2007, pp. 715-720.
Su, Ao-Jan, et al., "Drafting Behind Akamai: Inferring Network Conditions Based on CDN Redirections", IEEE/ACM Transactions on Networking, vol. 17, Issue 6, 2009, pp. 1752-1765.

* cited by examiner

*Primary Examiner* — Farid Homayounmehr
*Assistant Examiner* — Olanrewaju Bucknor
(74) *Attorney, Agent, or Firm* — Fernandez & Associates, LLP

(57) ABSTRACT

A method for profiling network traffic of a network, including obtaining a plurality of flows comprising a plurality of client IP addresses, a plurality of server IP addresses, and a plurality of server ports, extracting a plurality of fully qualified domain names (FQDNs) from a plurality of DNS flows in the network traffic, analyzing correlation between the plurality of flows and the plurality of FQDNs to generate a result, and presenting the result to an administrator user of the network.

16 Claims, 9 Drawing Sheets

DISCERNING WEB CONTENT AND SERVICES BASED ON REAL-TIME DNS TAGGING

BACKGROUND OF THE INVENTION

1. Field of the Invention

The present invention relates to computers and computer networks. More particularly, the invention relates to using domain name service (DNS) tagging to identify content and services associated with the traffic flows.

2. Background of the Related Art

The World Wide Web (abbreviated as WWW and commonly known as the Web) is a system of interlinked hypertext documents accessed via the Internet. With a Web browser, one can view Web contents, which are Web pages that may contain text, images, videos, and other multimedia. In addition, the Web pages can be navigated via hyperlinks using the Web browser.

In recent years, the Internet has witnessed the explosion of cloud-based services and video streaming applications. In both cases, content delivery networks (CDN) and/or cloud computing services are used to meet the scalability and availability requirements. An undesirable side-effect of this is that it decouples the owner of the content and the organization (e.g., CDN, cloud computing services) serving it. For example, videos of CNN® (a registered trademark of Cable News Network, Inc., Atlanta, Ga.) or YouTube® (a registered trademark of Google Inc., Mountain View, Calif.) as content owners can be served by Akamai® (a registered trademark of Akamai Technologies, Inc., Cambridge, Mass.) as a CDN or Google® (a registered trademark of Google Inc., Mountain View, Calif.) as a CDN. In another example, the Farmville® (a registered trademark of Zynga Inc., San Francisco, Calif.) game accessible from the Facebook® (a registered trademark of Facebook, Inc., Palo Alto, Calif.) (i.e., content owner) social network may be actually running on Amazon EC2® (a registered trademark of Amazon Technologies, Inc., Reno, Nev.) cloud computing platform. This may be even more complicated since various CDNs and content owners implement their own optimization mechanisms to ensure "spatial" and "temporal." diversity for load distribution. For instance, CNN uses Akamai® and Level3® (a registered trademark of Level 3 Communications, LLC, Broomfield Colo.) as CDNs for certain customers during daytime, while it only uses Level3® for the same customers at night. In addition, several popular sites like Twitter® (a registered trademark of Twitter, Inc., San Francisco, Calif.), Facebook®, and Google® have started adopting encryption (TLS/HTTPS) to deliver content to their users. This trend is expected to gain more momentum in the next few years. While this helps to protect end-users' privacy, it can be a big impediment to effective security operations. The above factors have resulted in "tangled" World Wide Web which is hard to understand, discern, and control.

SUMMARY

The problem of understanding the content on the Web is referred to as Web Content Cartography. In this context, embodiments of the invention provides a novel passive traffic monitoring system that helps in understanding the mapping between users, content owners, and the hosts serving the content. It leverages the information available in DNS queries and responses, correlates them to the actual data flows to not only reveal the aforementioned mapping, but also shed light on several other problems like port-service mapping, auto-matic service label extraction, and pure flow-set generation, etc. Generally, these issues have been addressed using manual approaches.

In general, in one aspect, the present invention relates to a method for profiling network traffic of a network. The method includes obtaining, by a processor of a computer system and from the network traffic, a plurality of flows comprising a plurality of client IP addresses, a plurality of server IP addresses, and a plurality of server ports; extracting, by the processor, a plurality of fully qualified domain names (FQDNs) from a plurality of DNS flows in the network traffic, wherein a DNS query contained in the plurality of DNS flows is initiated from a client IP address of the plurality of client IP addresses to request service based on a FQDN of the plurality of FQDNs that is contained in the DNS query, wherein a server IP address of the plurality of server IF addresses is resolved by a DNS server in the network based on the FQDN and returned in a DNS response contained in the plurality of DNS flows, and wherein the server IP address and a server port of the plurality of server ports are used in a first flow of the plurality of flows to provide service to the client IP address, analyzing, by the processor, correlation between the plurality of flows and the plurality of FQDNs to generate a result, wherein the correlation comprises the first flow providing service as requested based on the FQDN from the client IP address, and presenting, by the processor, the result to an administrator user of the network.

In general, in one aspect, the present invention relates to a system for profiling network traffic of a network. The system includes a data collector configured to obtain, from the network traffic, a plurality of flows comprising a plurality of client IP addresses, a plurality of server IP addresses, and a plurality of server ports; and extract a plurality of fully qualified domain names (FQDNs) from a plurality of DNS flows in the network traffic, wherein a DNS query contained in the plurality of DNS flows is initiated from a client IP address of the plurality of client IP addresses to request service based on a FQDN of the plurality of FQDNs that is contained in the DNS query, wherein a server IP address of the plurality of server IP addresses is resolved by a DNS server in the network based on the FQDN and returned in a DNS response contained in the plurality of DNS flows, and wherein the server IP address and a server port of the plurality of server ports are used in a first flow of the plurality of flows to provide service to the client IP address; and an analyzer configured to analyze correlation between the plurality of flows and the plurality of FQDNs to generate a result, wherein the correlation comprises the first flow providing service as requested based on the FQDN from the client IP address; and present the result to an administrator user of the network.

In general, in one aspect, the present invention relates to a non-transitory computer readable medium embodying instructions for profiling network traffic of a network. The instructions when executed by a processor includes functionality for obtaining, from the network traffic, a plurality of flows comprising a plurality of client IP addresses, a plurality of server IP addresses, and a plurality of server ports, extracting a plurality of fully qualified domain names (FQDNs) from a plurality of DNS flows in the network traffic, wherein a DNS query contained in the plurality of DNS flows is initiated from a client IP address of the plurality of client IP addresses to request service based on a FQDN of the plurality of FQDNs that is contained in the DNS query, wherein a server IP address of the plurality of server IP addresses is resolved by a DNS server in the network based on the FQDN and returned in a DNS response contained in the plurality of DNS flows, and wherein the server IP address and a server port of the plurality of server ports are used in a first flow of the plurality of flows to provide service to the client IP address, analyzing correlation between the plurality of flows and the plurality of FQDNs to generate a result, wherein the correlation comprises the first flow providing service as requested based on the FQDN from the client IP address, and presenting the result to an administrator user of the network.

Other aspects and advantages of the invention will be apparent from the following description and the appended claims.

DETAILED DESCRIPTION

Figure 1A:
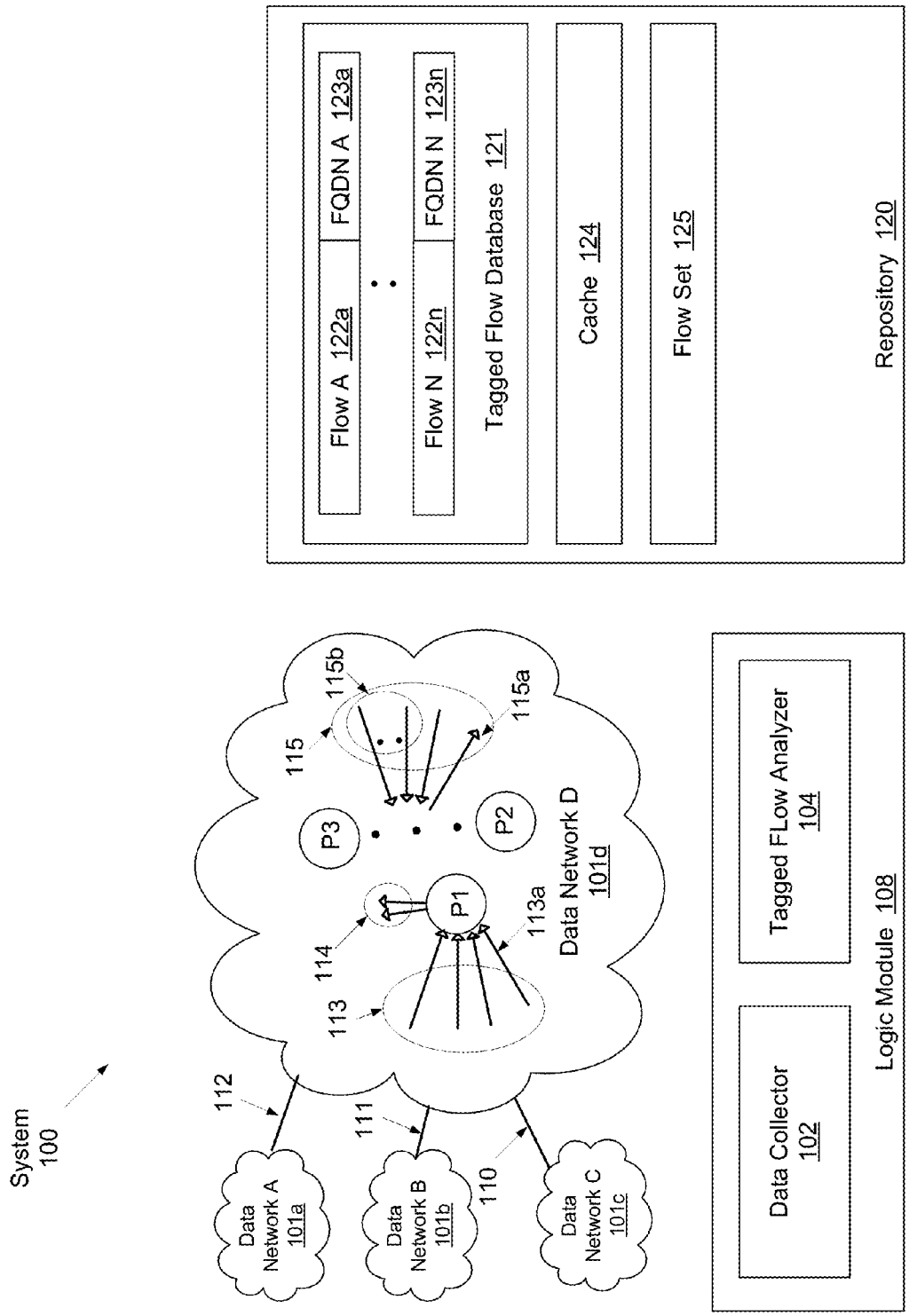
FIG. 1A shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally, a flow (e.g., a TCP flow) between two network hosts (e.g., a client and a server in a client-server application scenario) is a series of data records (referred to as packets or data packets, e.g., IP packets) regarding the communication between the two network hosts engaged in an Internet transaction. The Internet transaction may be related to completing a task, which may be legitimate or malicious. Each packet includes a block of data (i.e., actual packet content referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow and sequence information identifying a logical position of the packet in the flow. Said in other words, a flow consists of one or more packets having the same 5-tuple identifier, aggregate based on sequence information contained in the headers of the packets, and transmitted within a defined time window. Typically, a user command to execute an application initiates a flow from an application client (i.e., source address=client IP) to an application server (i.e., destination address=server IP), which is preceded by DNS flows (i.e., DNS query and DNS response) between the client IP and a DNS server to identify the server IP based on a domain name contained in the user command. Termination (or completion) of the flow may be marked by a TCP packet flag (e.g., "connection reset" or "fin") or if a time-out condition occurs when no more packet having the 5-tuple identifier is transmitted in the sequence beyond a pre-determined time-out period since the last transmitted packet in the flow. This time-out period may be heuristically determined by the application and is generally set at 2 min.

Throughout this disclosure, the terms "traffic flow," "data flow," "flow," "traffic stream," and "stream" are used interchangeably and may refer to a uni-directional flow, a bi-directional flow, a complete flow or any portion thereof unless explicitly stated otherwise. For example, a bi-directional flow may include a client-to-server uni-directional flow and a server-to-client uni-directional flow that are identifiable based on the flow header information. Further, the term "transport protocol" refers to a protocol associated with or based on top of a transport layer of a computer network. For example, the transport protocol may be referred to as layer-four (L4) protocol with respect to the OSI model (i.e., Open Systems Interconnection Reference Model of the network architecture). Examples of layer-four protocols include TCP, UDP, etc.

Further still, the term "application" or "network application" refers to an application associated with or based on top of an application layer of a computer network. For example, the network application may be referred to as layer-seven application with respect to the OSI model. Examples of layer-seven applications includes HTTP (HyperText Transfer Protocol), SMTP (Simple Mail Transfer Protocol), IRC (Internet relay chat), FTP (File Transfer Protocol), BitTorrent® (a registered trademark of BitTorrent, Inc., San Francisco Calif.), GTALK® (a registered trademark of Google, Inc., Mountain View, Calif.), MSN® (a registered trademark of Microsoft Corporation, Redmond, Wash., etc.). Layer-seven applications may also be referred to as layer-seven protocols.

Packet capture is the act of capturing data packets crossing a network. Partial packet capture may be performed to record headers without recording the total content of corresponding payloads. Deep packet capture may be performed to capture complete network packets including each packet header and complete packet payload. Once packets in a flow, or a portion thereof, are captured and stored, deep packet inspection may be performed to review network packet data, perform forensics analysis to uncover the root cause of network problems, identify security threats, and ensure data communications and network usage complies with outlined policy.

FIG. 1A shows a system block diagram of a system (100) in accordance with one or more embodiments of the invention. Those skilled in the art, having the benefit of this detailed description, will appreciate the components shown in FIG. 1A may differ among embodiments of the invention, and that one or more of the components may be optional. Although specific numbers of components are shown in FIG. 1A, different number of each component may be included. In one or more embodiments of the invention, one or more of the components shown in FIG. 1A may be omitted, repeated, supplemented, and/or otherwise modified from that shown in FIG. 1A. Accordingly, the specific arrangement of components shown in FIG. 1A should not be construed as limiting the scope of the invention.

A shown in FIG. 1A, the system (100) includes data networks A through D (101a, 101b, 101c, 101d), a logic module (108) having a data collector (102) and a tagged flow analyzer (104), and a repository (120) storing tagged flow database (121), cache (124), and flow set (125). Each of these networks A through D may be a portion of a larger network and are shown to be coupled via links (110, 111, 112). This larger network may include wired/wireless portions of local area network, wide area network, Internet, and/or other computer and communication networks. The network D (101d) includes hosts (P1, P2, P3, etc.). As shown, host (P1) is a source or destination associated with flows (113, 114) while hosts (P2, P3, etc.) are source(s) or destination(s) associated with flows (115). Accordingly, the flows (113, 114) are referred to as attached to the server (P1) while the flows (115) are referred to as attached to the servers (P2, P3, etc.). In particular, the flows 113) include a particular flow (113*a*) while the flows (115) include another particular flow (115*a*). Further, a portion of the flows (115) is a set of unidirectional flows (115*b*). In one or more embodiments of the invention, each flow in these flows (113, 114, 115) relates to an application executing on the attached server at a particular time. For example, flows (113) may include commands (e.g., HTTP command such as GET, POST, DELETE, etc.) of an application sent from various clients (not shown) to the server (P1) while the flows (114) may include responses (e.g., HTTP response such as 200 OK, 404 Not Found, etc.) of the application sent from the server (P1) to various clients in return. Accordingly, the flows (113, 114) are referred to as "associated with an application executing on server (P1)", "corresponding to an application executing on server (P1), "generated by an application executing on server (P1)", "generated to execute an application on server (P1)", or "generated for executing an application on server (P1)" in an interchangeable manner depending on the context unless explicitly stated otherwise.

In one or more embodiments, the data collector (102) is configured to obtain network traffic flows (e.g., flows (113), flows (114), flows (115), flows (115*b*), etc.) associated with a number of servers (e.g., server (P1), server (P2), server (P3), etc.) executing one or more network applications in the network. Specifically, the data collector (102) may observe and collect, for example from links (110, 111, 112), information regarding network traffic when available and to filter and organize the collected traffic data regarding duplicate records or out-of-order records. Accordingly, the collected traffic data is reconstructed to represent data packets of a flow in an appropriated order (e.g., based on sequence information in the headers) consistent with the Internet transaction performed by the flow. Throughout this disclosure, "obtaining a flow" may refer to obtaining a complete flow or any portion thereof depending on the context unless explicitly stated otherwise.

As noted above, in client-server application scenarios, flows generated by the application are preceded by DNS flows to identify the server IP from domain name in a client command. For example, the client requests content from a server in the network by specifying the domain name of the server in the request command. The actual server IP address is then returned by DNS mechanism (e.g., a DNS server) of the network based on the domain name. Throughout this disclosure, the terms "content," "resource," and "service" may be used interchangeably to refer to any of content/resource/service requested by a client and provided by a server. Further, the terms "client," "client device," "client IP," and "client IP address" may be used interchangeably depending on the contexts; the terms "server," "server device," "server IP," and "server IP address" may be used interchangeably depending on the contexts. As is known in the art, the DNS is a hierarchical distributed naming system for computers connected to the Internet. It generally translates domain names meaningful to humans into the IP addresses useful for routing. A DNS server (i.e., DNS name server) stores the DNS records for a domain name, such as address (A) records, name server (NS) records, and mail exchange (MX) records. A domain name consists of one or more parts, technically called "labels", that are conventionally concatenated, and delimited by dots (i.e., periods), such as the DNS labels www, example, and com in the domain name www.example.com. Typically human readable, DNS labels therefore naturally convey information about service, content and information offered by a given domain name.

The labels in the domain name are organized in a hierarchical fashion. The top-level domain (TLD) is the last part of the domain name (i.e., .com is the TLD in the domain name www.example.com). The subdomains are then generated by pre-pending labels, so that www.example.com is a subdomain of example.com, which is a subdomain of .com. Throughout this disclosure, the first subdomain after the TLD is referred to as the second level domain, which generally refers to the organization that owns the domain name (e.g., example.com). Fully qualified domain name (FQDN) is the domain name complete with all its labels that unambiguously identify a resource. For example, www.example.com is a FQDN. FQDN specifies all domain levels, including the top-level domain and the root zone. The FQDN therefore uniquely identifies the device.

In one or more embodiments, the data collector (102) is further configured to identify and associate domain name information provided by DNS with the data flows. Accordingly, the flows (e.g., flow A (122*a*), flow N (122*n*)) are tagged with the DNS information (e.g., FQDN A (123*a*), FQDN N (123*n*)) and stored in the tagged flow database (121).

In one or more embodiments, the tagged flow analyzer (104) is configured to analyze and correlate the information in the tagged flow database (121) to generate information regarding the mapping between users, content owners, and the hosts serving the content. Additional details of the data collector (102), tagged flow analyzer (104), and the tagged flow database (121) are described in reference to FIG. 1B below.

Figure 1B:
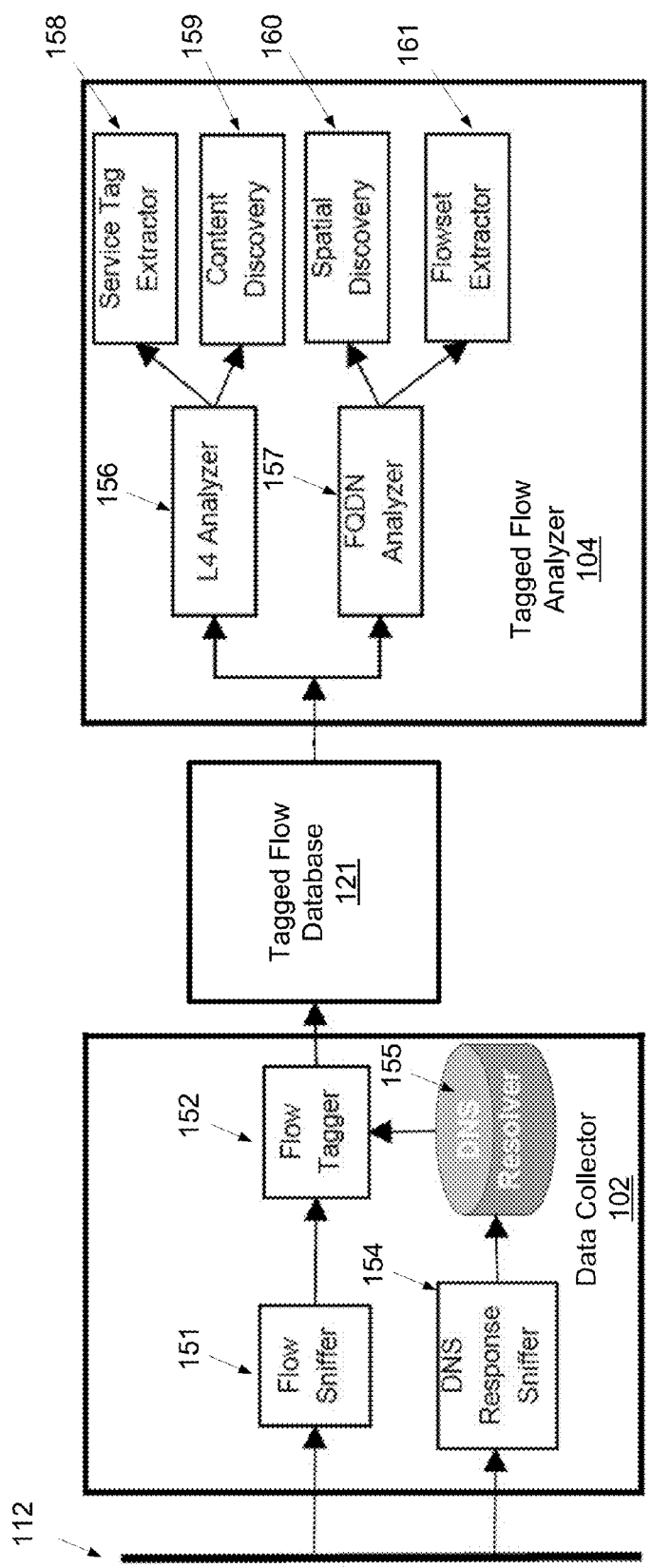
FIG. 1B shows more details of the system block diagram according to aspects of the invention.

FIG. 1B shows more details of the system (100) in accordance with one or more embodiments of the invention. Those skilled in the art, having the benefit of this detailed description, will appreciate the components shown in FIG. 1B may differ among embodiments of the invention, and that one or more of the components may be optional. Although specific numbers of components are shown in FIG. 1B, different number of each component may be included. In one or more embodiments of the invention, one or more of the components shown in FIG. 1B may be omitted, repeated, supplemented, and/or otherwise modified from that shown in FIG. 1B. Accordingly, the specific arrangement of components shown in FIG. 1B should not be construed as limiting the scope of the invention.

FIG. 1B shows a portion of the system (100) of FIG. 1 including the link (112), the data collector (102), the tagged flow database (121), and the tagged flow analyzer (104).

In one or more embodiments, the data collector (102) has two low-level sniffing blocks: (i) the flow sniffer (151) that reconstructs layer-4 flows by aggregating packets based on the 5-tuple identifier and (ii) the DNS response sniffer that decodes the DNS responses, and maintains a local data structure referred to as the DNS resolver (155). The DNS resolver (155) maintains a mapping between client IP, domain names queried, and the server IP(s) included in the DNS response. In particular, for each response, it stores the set of server IP addresses returned for the fully qualified domain name (FQDN) queried, and associates them to the client IP that generated the query.

When a data flow is reconstructed by the flow sniffer (151), it is passed on to the flow tagger (152). The flow tagger (152) queries the DNS resolver (155) to tag the incoming flow referenced by the 5-tuple identifier or a portion thereof (e.g., the client IP/server IP pair). The DNS resolver (155) looks up its own cache (124) to see if it has a mapping for the requested 5-tuple identifier or client IP/server IP pair. If it finds a mapping then the flow information is augmented with the server FQDN and stored in the tagged flow database (121). These tagged flows in the flows database are shown in FIG. 1 as flow A (122a) tagged with FQDN A (123a), flow N (122n) tagged with FQDN (123n), etc. and will be used by the tagged flow analyzer (104) to generate various analysis output results.

Using the mapping in the DNS resolver (155), any subsequent flow originated by the client IP to one of the returned server IP addresses can be associated to the original FQDN in an expedient manner without incurring the processing delay when the initial flow was tagged without any applicable mapping entry in the DNS resolver (155). Specifically, the flow tagger (152) queries the DNS resolver (155) for a FQDN based on the 5-tuple identifier or client IP/server IP pair of the subsequent flow.

When an application executing on a client device needs to access a resource, a query (referred to as a DNS query) is sent to the local DNS module implemented on the client device (typically by the operating system of the client device) to invoke a recursive address resolution mechanism that forwards the query to the upstream DNS name server in the network. Responses (referred to as DNS responses) from the recursive address resolution mechanism carry a list of answers, for example a list of server IP addresses that offer the requested resource.

Local DNS module may implement local caching of server IP addresses returned from the recursive address resolution mechanism, entailing the recording and subsequent consultation of the copy instead of initiating a new request upstream. The time for which a local DNS module caches a DNS record for the client device is determined by a value referred to as the time-to-live (TTL) associated with every record. It is set by the authoritative DNS name server, and varies from few seconds (e.g., for CDN and highly dynamic services) to days. Memory limit and timeout deletion policies of the local DNS module can affect the TTL. Generally, TTL is typically less than 1 hour. Based on this local DNS module caching scheme, the client device may contact the server IP address directly during the TTL to access the resource based on the cached information (i.e., the server IP address indexed by the FQDN in the local DNS module cache) without triggering the recursive address resolution mechanism by sending the DNS query containing the FQDN. Accordingly, multiple requests for the same resource may generate multiple flows between the client device and the server IP address during the TTL preceded by a single DNS query and DNS response.

In one or more embodiments, the DNS resolver (155) is configured to (i) store information about domain names that were queried by a client IP and (ii) find which server IP addresses it can eventually contact for the requested resources. That is, it builds a replica of the local DNS module caches on the client devices by sniffing messages exchanged between client IP addresses with the DNS name server during the recursive address resolution process.

In one or more embodiments, the DNS resolver (155) includes a cache (124) that responds to an input client IP/server IP pair with the most recent FQDNs. Each entry in the cache (124) stores the FQDN and uses the client IP/server IP pair as a look-up key. An example cache implementation for the DNS resolver (155) is described in reference to FIG. 3A below.

In one or more embodiments, the tagged flow analyzer (104) includes (i) the layer-4 (L4) analyzer (156) coupled to one or more of service tag extractor (158) and content discovery module (159) and (ii) the FQDN analyzer (157) coupled to one or more of spatial discovery module (160) and flowset extractor (161).

TABLE 1

| 1: | TAG EXTRACTION(dPort, limit) |
| 2: | Input: targeted dPort, limit of tags to return |
| 3: | Output: The ranked list of tags |
| 4: | DomainNameSet ← FlowDB.query(dPort) |
| 5: | for all FQDN in DomainNameSet do |
| 6: |   TokenSet ← DomainName.split(NoTLD\|No2ndDomain) |
| 7: | end for |
| 8: | for all Token in TokenSet do |
| 9: |   Token.score.update( ) |
| 10: | end for |
| 11: | Return(Tokens.sort(limit)) |

The L4 analyzer (156) first identifies common ports (i.e., server ports, which are source ports for the flows from server to client or destinations ports for the flows from client to server) in the tagged flow database (121). Then, service tag extractor (158) analyzes the subset of flows directed to each of these common ports to extract labels from the FQDNs associated with each subset.

TABLE 1 shows example pseudo-code for the L4 analyzer (156) to perform tag extraction using service tag extractor (158). Consider a target dPort, the L4 analyzer (156) retrieves all FQDNs associated to flows that are directed to dPort (line 4). Each FQDN label is considered. TLDs and 2nd-level domains are discarded, while remaining labels are split into tokens by considering non-alphanumeric characters as separator. Numbers are replaced by a wildcard "N" character (line 5-7). For instance, FQDN smtp2.mail.google.com generates the list of tokens smtpN and mail. The occurrence frequency of a token is used as measure of relevance of the token for the targeted port (line 8-9). A logarithmic scale score(X) is used to mitigate the bias due to some clients generating a lot of connections to a FQDN having token X. Let $N_X(c)$ be the number of flows originated by client IP=c having the token X, then the score of X is score(X)=$\Sigma_c \log(N_X(c)+1)$. Tokens are then ranked by score and the top limit number of tokens are returned to the users (line 11). Any criteria can be applied to limit the list of returned tokens. For instance, the list can simply be limited to the top 5 tokens, or to the top 5%, or to the subset that sums to the k-th percentile.

TABLE 2

| 1: | CONTENT DISCOVERY(ServerIPSet) |
| 2: | Input: The list of targeted serverIP |
| 3: | Output: The list of handled FQDNs |
| 4: | DomainNameSet ← FlowDB.query(ServerIPSet) |
| 5: | for all FQDN in DomaimNameSet do |
| 6: |   TokenSet ← DomainName.split(FQDN) |
| 7: | end for |
| 8: | for all Token in TokenSet do |
| 9: |   Token.score.update( ) |
| 10: | end for |
| 11: | Return(Tokens.sort( )) |

The L4 analyzer (156) may also be used with the content discovery module (149) to map which content is served by which server IP. As depicted in the example algorithm in TABLE 2, the LA analyzer (156) looks for the FQDNs of flows directed to server IP (line 4-7). Depending on the desired granularity, FQDN or sub-domain can be considered. Said in other words, either a detailed list or a coarse list is provided regarding services and contents that server IP is serving. The scoring function Token.score.update( ) is used to measure the popularity of service to rank tags (line 8-10). In addition, by grouping all server IP addresses managed by the a given organization (e.g., Akamai®, Level3®, or Amazon®) as defined by the whois database known to those skilled in the art, the L4 analyzer (156) discovers which content is provided by such organization. An example result is described in reference to FIG. 3D below.

While the L4 analyzer groups flows based on L4 metrics to extract information from FQDN, the FQDN analyzer (157) groups flows according to FQDNs to extract relevant information about L4 metrics. For example, the relevant information may include a measure of spatial diversity of servers and a filtered flowset useful for characterization and signature extraction.

TABLE 3

| | |
|---|---|
| 1: | SPATIAL DISCOVERY(FQDN) |
| 2: | Input: The targeted FQDN |
| 3: | Output: ranked list of serverIP addresses |
| 4: | 2ndDomain ← FQDN.split( ) |
| 5: | ServerSet ← FlowDB.queryByDomainName(2ndDomain) |
| 6: | FQDNset ← 2ndDomain.query( ) |
| 7: | for all FQDN in FQDNSet do |
| 8: | FQDN.ServerSet ← FlowDB.queryByDomainName(FQDN) |
| 9: | end for |
| 10: | Return (FQDN.ServerSet.sort( ), ServerSet.sort( )) |

In one or more embodiments, the FQDN analyzer (157) uses the spatial discovery module (160) to identify server IP addresses that are able to serve a particular resource. TABLE 3 shows an example pseudo-code for the spatial discovery function. The tagged flow database (121) is first queried to retrieve all server IP addresses of flows directed to the targeted FQDN. It starts by considering the 2nd-level domain to identify all servers serving content from the same organization (line 4-5). Then, by narrowing down the queries, it can discover which of those servers are specialized in a particular content (line 6-9). This allows (i) to unveil information about the structure of servers (e.g., a single server, a CDN, or multiple CDNs) that handle the FQDN, and (ii) to discover which servers handle a more specific resource, e.g., mail.google.com versus scholar.google.com. A weighting function is used to rank server IP addresses according to, e.g., their popularity among the dataset.

TABLE 4

| | |
|---|---|
| 1: | FLOWSET-EXTRACTOR(GroupingRule) |
| 2: | Input: The targeted GroupingRule |
| 3: | Output: The Flowset |
| 4: | DomainNameSet ← FlowDB.query(GroupingRule) |
| 5: | for all Flows in DomainNameSet do |
| 6: | Flow.score.update( ) |
| 7: | end for |
| 8: | Flowset ← DomainNameSet.Sample( ) |
| 9: | Return(Flowset) |

Generally, security and network management operations rely on the ability to classify flows using signatures (e.g., L4 signature or L7 signature known to those skilled in the art). TABLE 4 shows an example pseudo-code for extracting a flowset (125) to be used as a training set for extracting signature(s) for the application that generates the flows. As is known to those skilled in the art, a required task to train a flow classifier (not shown) is the definition of a proper training set, i.e., the creation of a set of flows (e.g., flowset (125)) from which to extract a signature. For examples, behavioral classifiers (not shown) can extract the L4 signatures from the flowset (125) while DPI based classifiers (not shown) can extract L7 payload signatures from the flowset (125).

Since FQDNs are, by definition, labels that uniquely identify a given service (i.e., provided by an application executing on a server), the FQDN analyzer (157) exploits the information contained in the FQDNs to define the training set for extracting signatures of the given service. For example, the FQDN analyzer (157) may use the flowset extractor (161) to perform three different kinds of grouping based on FQDNs:

(1) FQDN granularity: at the most granular level, the flowset extractor (161) constructs the flowset (125) as a subset of the tagged flow database (121) based on the FQDN. For instance, this distinguishes traffic destined to mail.example.com from traffic destined to login.example.com even if they share the same server IP address. In this example, the signature represents characteristics of flows sharing the same FQDN.

(2) 2nd-level-domain granularity: the flows in the tagged flow database (121) are aggregated into the flowset (125) based on the 2nd-level domain. By considering only *.example.com; the flowset (125) will thus refer to all possible services of a given organization. In this example, the signature represents characteristics of flows sharing the same 2nd-level-domain in a FQDN.

(3) label granularity: flows in the tagged flow database (121) are grouped based on the labels present in the FQDNs. For example, the flowset (125) may include the group of flows that have the label smtp in the FQDN. This example flowset (125) is suitable as a signature extraction training set for classifying the smtp protocol as defined by the label. In this example, the signature represents characteristics of flows sharing the same FQDN label in a FQDN.

Figure 2:
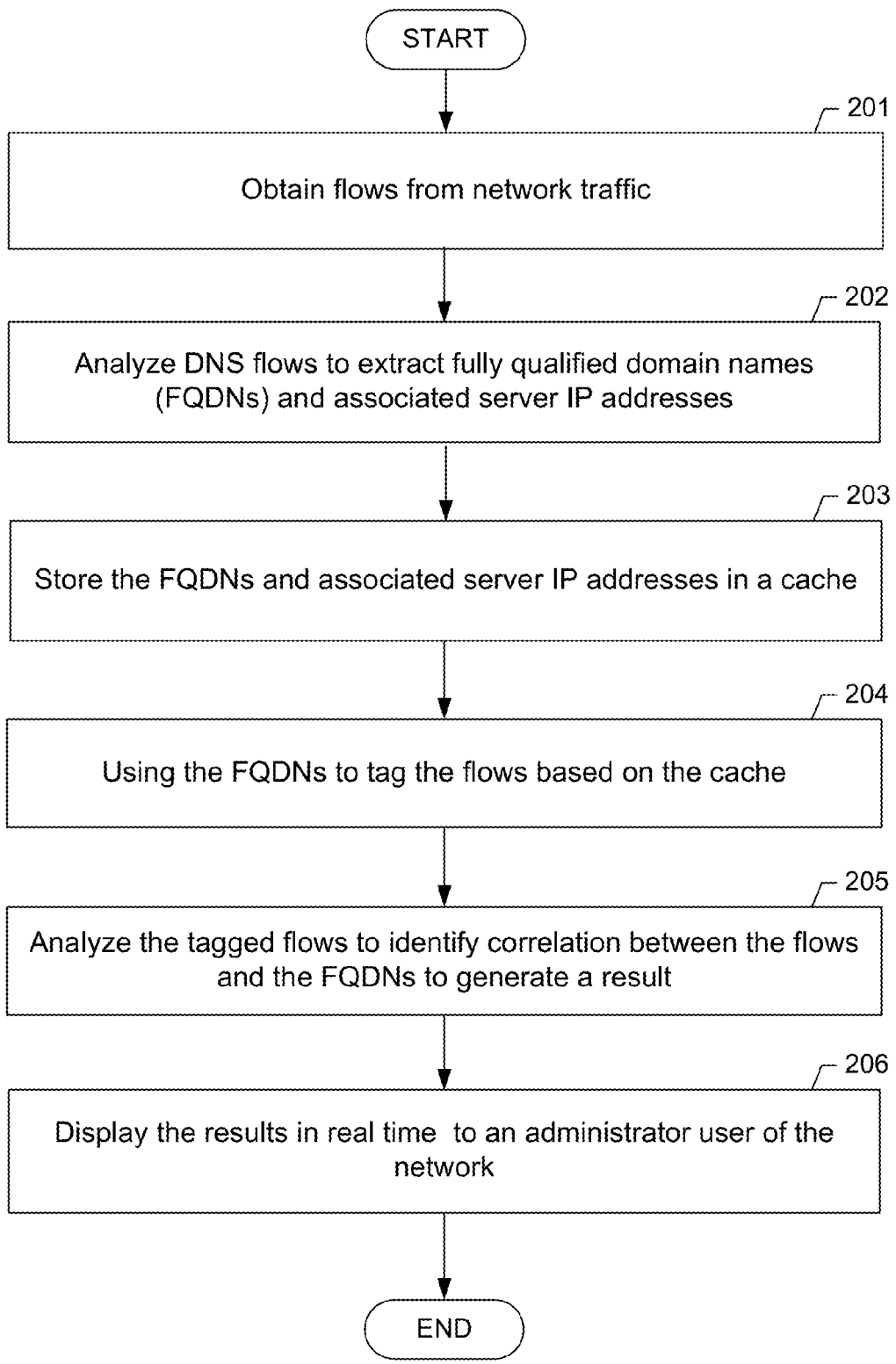
FIG. 2 shows a flowchart of a method according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1A above.

Turning to the discussion of FIG. 2A, initially in Step 201, flows are obtained from network traffic. In one or more embodiments, the flows are obtained using the data collector (102) of FIG. 1A. As is known in the art, a flow in the network traffic is typically identified by a 5-tuple consisting of source address, destination address, source port, destination port, and transport protocol. Accordingly, the flows include multiple client IP addresses, multiple server IP addresses, and multiple server ports and are a result of multiple client devices requesting contents/resources/services (interchangeably referred to as service(s)) via the network that are provided in return by multiple server devices. Typically, the client devices' requests are based on domain names and corresponding server devices are identified via a domain name service mechanism of the network.

In Step 202, DNS flows of the domain name service mechanism are analyzed to extract fully qualified domain names (FQDNs) and associated server IP addresses. In one or more embodiments, the FQDNs are extracted using the data collector (102) of FIG. 1A. As is known in the art, a DNS query contained in the DNS flows is initiated from a client IP address to request service based on a FQDN contained in the DNS query. As a result, a server IP address is resolved by a DNS server in the network based on the FQDN and returned in a DNS response contained in the DNS flows. Subsequently, the server IP address and a server port are used in a flow to provide service to the requesting client IP address.

Figure 3A:
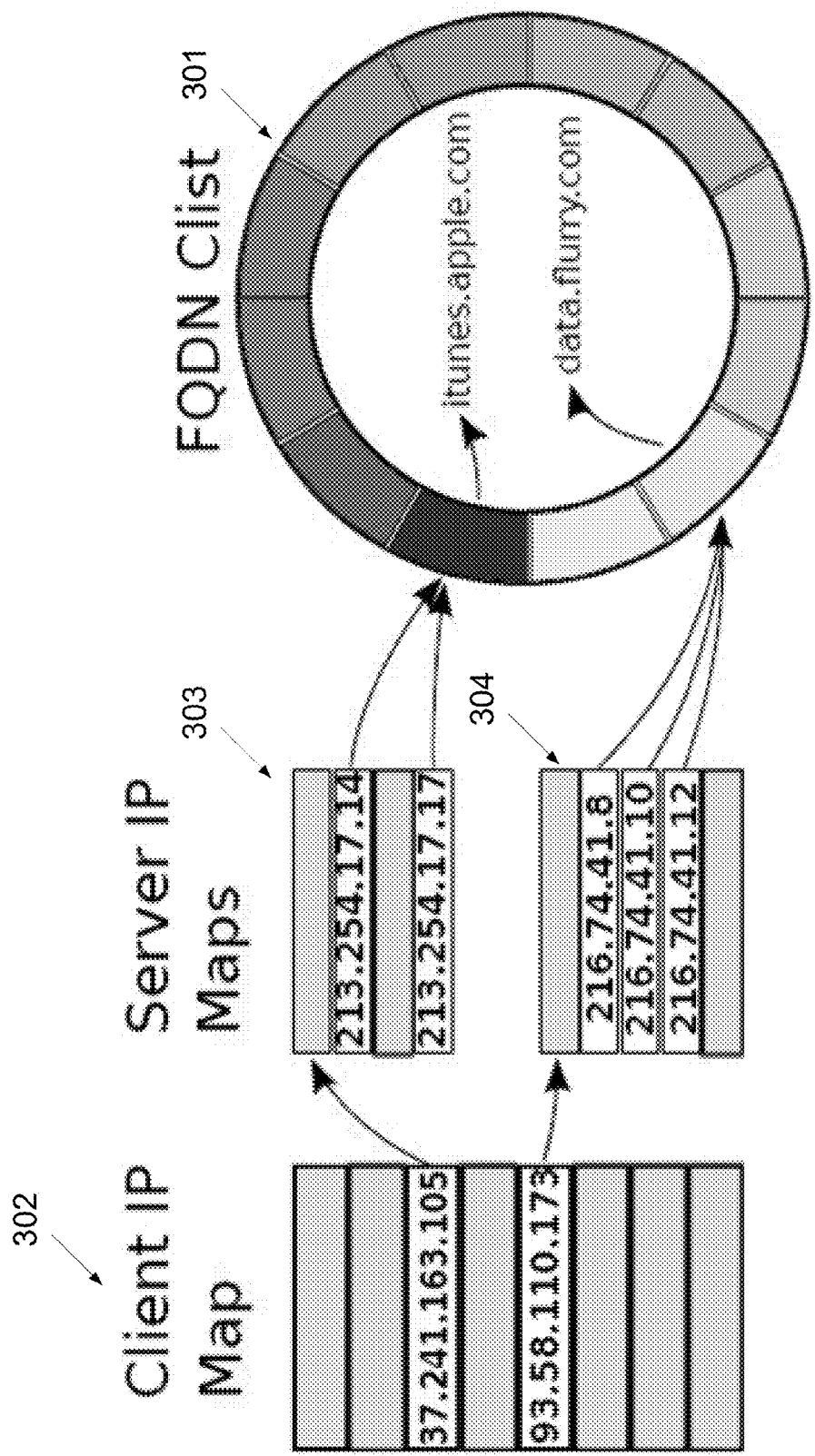
FIGS. 3A-3E show various examples according to aspects of the invention.

Generally, a large number of clients may request the same service (e.g., based on the same FQDN) during a period of time from different geographical locations. To satisfy the concurrent requests form diverse geographical locations, more than one server may be configured in the network to provide the service as requested based on the same FQDN. For example, different servers may be included in different portions of the network to deliver the same service. Such portions of the network may be topologically separated, operated by separate organizations, and referred to as content delivery networks (CDNs). As a result, more than one server IP addresses are resolved by the DNS server to provide service based on the FQDN as requested from multiple client IP addresses. Further, a single server may be configured to provide multiple services. As a result, a server IP address may be resolved by the DNS server to provide service based on any one of several FQDNs as requested from client IP addresses in the network. Examples of these scenarios are shown in FIGS. 3D and 3E below.

Steps 203 through 205 illustrate identifying and analyzing correlation between the flows and the FQDNs that are obtained/extracted as described above.

In Step 203, the FQDNs and associated server IP addresses returned from the DNS server are stored in a cache. In one or more embodiments, the cache (124) of FIG. 1A is used. Specifically, in response to extracting a FQDN from a DNS response and determining that the FQDN is not yet stored in the cache (124), the data collector (102) of FIG. 1A combines the client IP address and the server IP address, from the DNS query and the DNS response, as an index key to store/retrieve the FQDN in the cache (124). An example algorithm of Step 203 is shown in TABLE 5 below.

In Step 204, the flows are tagged using the FQDNs to generate tagged flows. In one or more embodiments, a flow is tagged in real time by the data collector (102) as it is obtained. In one or more embodiments, the term "real time" refers to that the flow is tagged prior to completion of the flow. For example, the client IP address and the server IP address of the flow are used as the index key in an attempt to retrieve a FQDN from the cache (124) as the flow is obtained from the network traffic. If the attempt is successful, the flow is immediately tagged in real time using the retrieved FQDN. This typically means that the flow is obtained within the TTL of an entry in the cache (124) that is created from a preceding DNS query and corresponding response. If the attempt is not successful, the client IP address and the server IP address of the flow are used to analyze prior DNS queries and responses to identify the FQDN contained in a, client request for service that has initiated the flow in the first place. Accordingly, the flow is tagged using the identified FQDN. The time required to tag the flow in this scenario may be longer than the duration of the flow, in which case the flow is not tagged in real time. Depending on the configuration (e.g., size) of the cache (124), a percentage of flow may be tagged prior to their completion thus satisfying the real time requirement. Conversely, based on a pre-determined percentage of flows that are targeted to be tagged in real time, the configuration (e.g., size) of the cache (124) may be determined. An example of determining the size of the cache (124) to meet a pre-determined percentage real time requirement is described in reference to FIGS. 3A-3C below.

In one or more embodiments, tagging the flow includes storing the server IP address and/or the server port in a database as an entry tagged by the corresponding FQDN. For example, the server IP address is stored and tagged by the FQDN in the entry for later analysis to identify correlation between the FQDNs and the server IP addresses. In another example, the server port is stored and tagged by the FQDN in the entry for later analysis to identify correlation between the FQDNs and the server ports. Additional information in the 5-tuple identifier of the flow may also be stored and tagged by the FQDN in the entry for later analysis to identify additional correlation between the FQDNs and the flows.

In Step 205, correlation between the flows and the FQDNs obtained/extracted in Steps 201/202 above are identified and analyzed to generate a result. For example, the correlation includes the types of relationships such as the flow providing service as requested based on the FQDN from the client IP address. In one or more embodiments, identifying and analyzing the correlation between the flows and the FQDNs include tallying a portion of the flows based on (i) the FQDNs and (ii) the server IP addresses and/or the server ports. In one or more embodiments, such tally is performed by analyzing the tagged flows described above.

In Step 206, the result is presented to an administrator user of the network. For example, the result may be presented as a diagram, an illustration, a report, etc. that is displayed on a device or formatted in an electronic or paper report.

In one or more embodiments, the result is presented to the administrator user in real time by generating the result prior to completion of a new flow, where the result includes the effect of the new flow. Said in other words, the result is updated in real time as each new flow is obtained and analyzed for inclusion in the result prior to the completion of the obtained new flow.

In one or more embodiments, the analysis and the result are further based on FQDN labels extracted from the FQDNs. Specifically, the FQDN labels are alphanumeric segments delimited by periods in the FQDNs. Accordingly, the aforementioned tally of the flows is based on (i) the FQDN labels and (ii) the server IP addresses and/or the server ports. Examples of such analysis techniques and results are shown in reference to TABLES 1, 2, 6, and 7.

In one or more embodiments, the result is based on a portion of the FQDNs sharing a common top level domain name where FQDN labels are extracted from these FQDNs to generate a hierarchical diagram representing relationships of the portion of the FQDNs and the server IP addresses. Specifically, the hierarchical diagram includes nodes corresponding to the FQDN labels and links linking the nodes based on connectivity of the FQDN labels in these FQDNs sharing the common top level domain name. In particular, a leaf node of the hierarchical diagram corresponds to one FQDN in these FQDNs and includes a tally of flows associated with the FQDN. Examples of such analysis technique and result are shown in reference to TABLE 3 and FIG. 3E.

In one or more embodiments, the result is based on extracting, in response to the aforementioned analysis based on the FQDN, a portion of the flows to form a training set where a signature associated with the FQDN is generated based on the training set. Specifically, the result includes the signature and any further flow classification based on the signature. Examples of such analysis technique and result are shown in reference to TABLE 4 above. As noted above, the signature may represent characteristics of flows sharing the same FQDN, characteristics of flows sharing the same 2nd-level-domain in a FQDN, or characteristics of flows sharing the same FQDN label in a FQDN.

FIGS. 3A-3E show application example results in accordance with embodiments of the invention.

As noted above, the DNS resolver (155) of FIG. 1 includes a cache (124) that responds to an input client IP/server IP pair and returns the most recently logged FQDNs. FIG. 3A shows an example of the cache (124). Each entry in the cache (124) stores the FQDN and uses the client IP/server IP pair as look-up keys. To avoid garbage collection, FQDN are stored in a circular list, Clist (301) shown in FIG. 3A. Generally, a circular list includes a pointer that identifies the next available entry where to insert an entry. As shown in FIG. 3A, Clist (301) is organized in a FIFO ordering or other pre-determined cache replacement scheme and has a size L that limits the cache entry lifetime (i.e., TTL).

In one or more embodiments, lookup of cache (124) is performed using two sets of tables. In an example shown in FIG. 3A, the first table (302) uses the client IP 37.241.163.105 as key to find a second table (303), from where the server IP keys 213.254.17.14 and 213.254.17.17 point to the most recent FQDN entry itunes.apple.com in the Clist (301) that was queried by the client IP 37.241.163.105. In another example shown in FIG. 3A, the first table (302) uses the client IP 93.58.110.173 as key to find a another table (304), from where the server IP keys 216.74.41.8, 216.74.41.10, and 216.74.41.12 point to the most recent FQDN entry data.flurry.com in the Clist (301) that was queried by the client IP 93.58.110.173.

TABLE 5 shows an example pseudo-code for the "insert( )" and "lookup( )" functions for accessing the Clist (301). Because DNS responses carry a list of possible server IF addresses, more than one server IP can point to the same FQDN entry (line 11-22). When a new DNS response is observed, the information is inserted in the Clist (301), eventually removing old entries referring to a previous response (line 12-15). When an entry in the DNS circular array Clist (301) is overwritten, the old client IP and server IF keys are removed from the maps (i.e., tables (302), (303), and (304)) before inserting the new one (line 25).

TABLE 5

| | |
|---|---|
| 1: | INSERT(DNSresponse) |
| 2: | Input: DNSresponse |
| 3: | |
| 4: | (FQDN.ClientIP, answer List) ← decode(DNSresponse) |
| 5: | DNEntry ← newDNEntry(FQDN) |
| 6: | mapServer ← mapClient.get(clientIP) |
| 7: | if mapServer = null then |
| 8: |    mapServer ← new MapServer( ) |
| 9: |    mapClient.put(clientIP, mapServer) |
| 10: | end if |
| 11: | for all serverIP in answerList do |
| 12: |    /* replace old references */ |
| 13: |    if exists mapSever.get(serverIP) then |
| 14: |       OLDEntry ← mapSever.get(serverIP) |
| 15: |       OLDEntry.removeOldReferences( ) |
| 16: |    end if |
| 17: |    /* Link back and forth |
| 18: |    references to the new DNSEntry */ |
| 19: |    mapServer.put(serverIP, DNEntry) |
| 20: |    MSEntry ← mapServer.get(serverIP) |
| 21: |    DNEntry.insert(MSEntry) |
| 22: | end for |
| 23: | /* insert next entry in circular array */ |
| 24: | OldDNEntry ← Clist.nextEntry( ) |
| 25: | OldDNEntry.deleteBackreferences( ) |
| 26: | Clist.nextEntry ← DNEntry |
| 27: | |
| 28: | LOOKUP(ClientIP, ServerIP) |
| 29: | Input: The ClientIP and ServerIP of a flow |
| 30: | Output: The FQDN of ServerIP as requested by Client|IP |
| 31: | |
| 32: | mapServer ← mapClient.get(clientIP) |
| 33: | if mapServer contains serverIP then |
| 34: |    DNEntry ← mapServer.get(serverIP) |
| 35: |    return DNEntry.FQDN |
| 36: | end if |

Figure 3B:
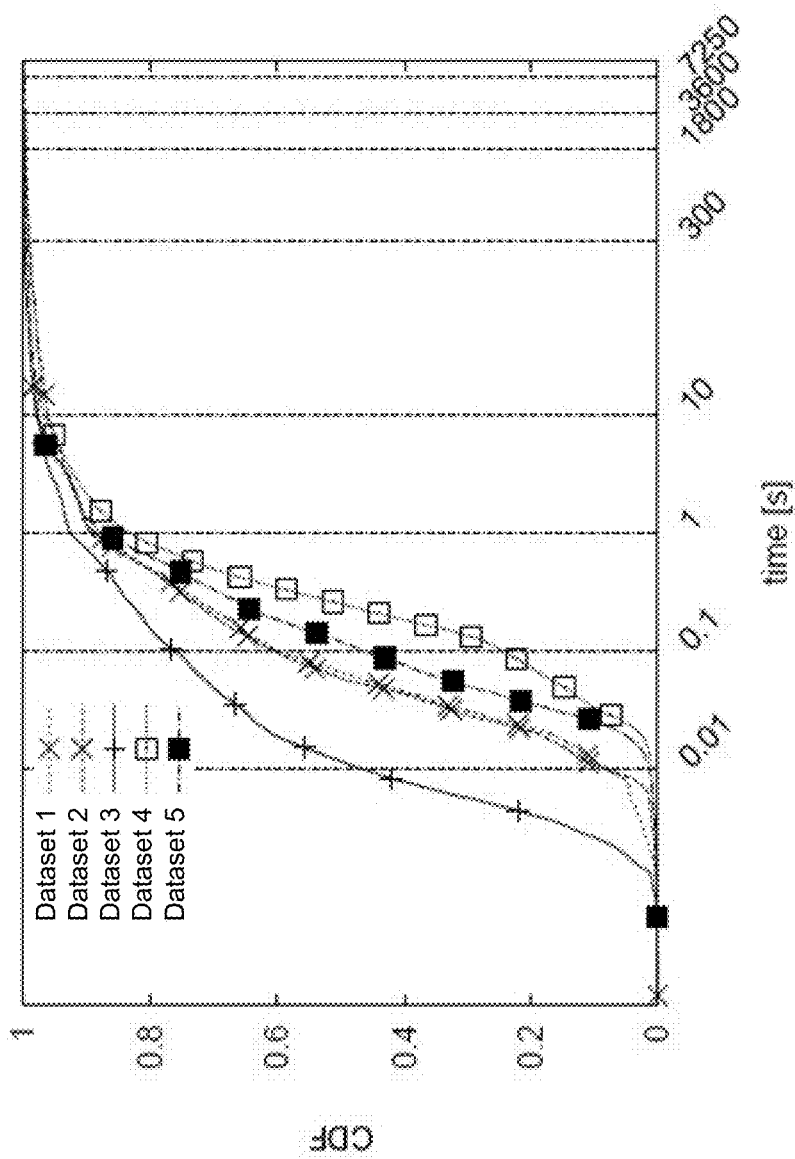

FIG. 3B shows the Cumulative Distribution Function (CDF) (represented by Y-axis) of the "first flow delay", i.e., the time (represented by X-axis) elapsed between the observation of the DNS response directed to client IP and the first packet of the first flow directed to one of the server IP addresses in the answer list returned by DNS response. Semi-log scale is used for the sake of clarity. In each of the example datasets (i.e., dataset 1 through 5), the first TCP flow is observed after less than 1 s in about 90% of cases. Access technology and sniffer placement impact this measurement; for instance, FTTH exhibits smaller delays, while the 3G technology suffers the largest values. In all traces, for about 5% of cases the first flow delay is higher than 10 s, with some cases larger than 300 s. This is generally due to aggressive pre-fetching performed by applications (e.g., web browsers) that resolve all FQDNs found in the content when the content is acquired, and not just before a new resource is actually accessed.

Figure 3C:
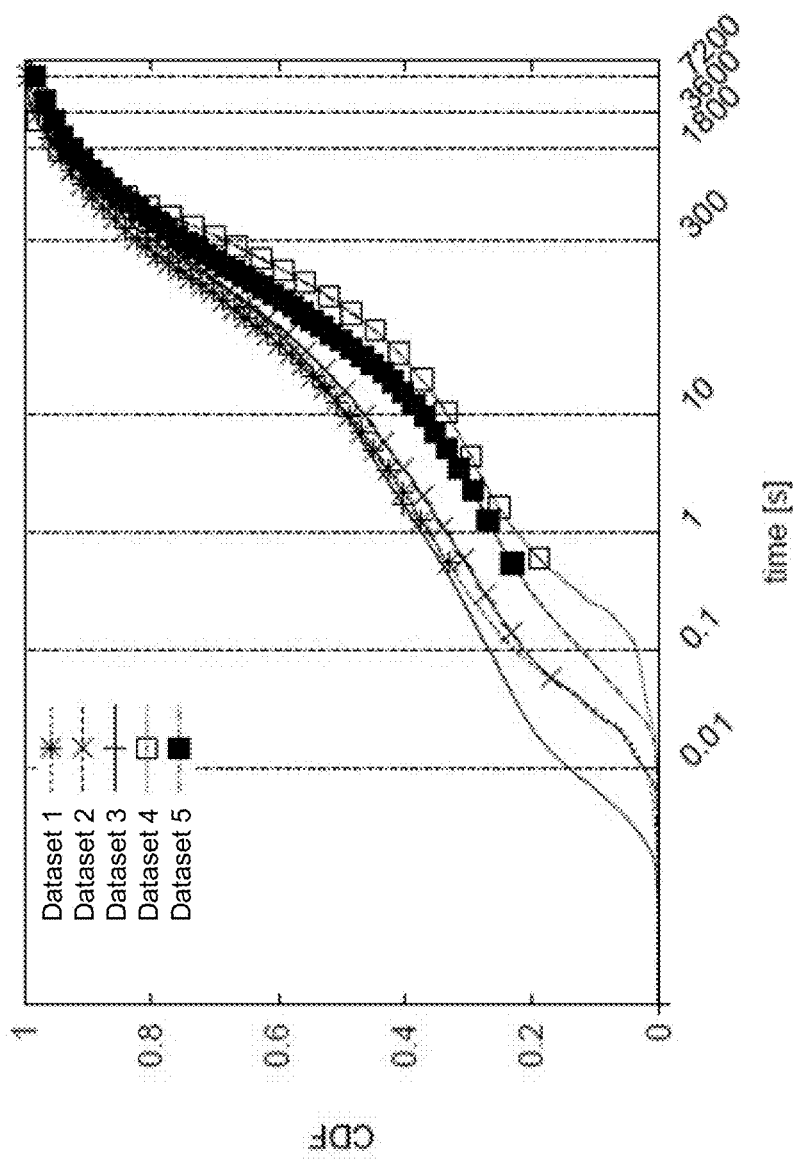
Figure 3D:
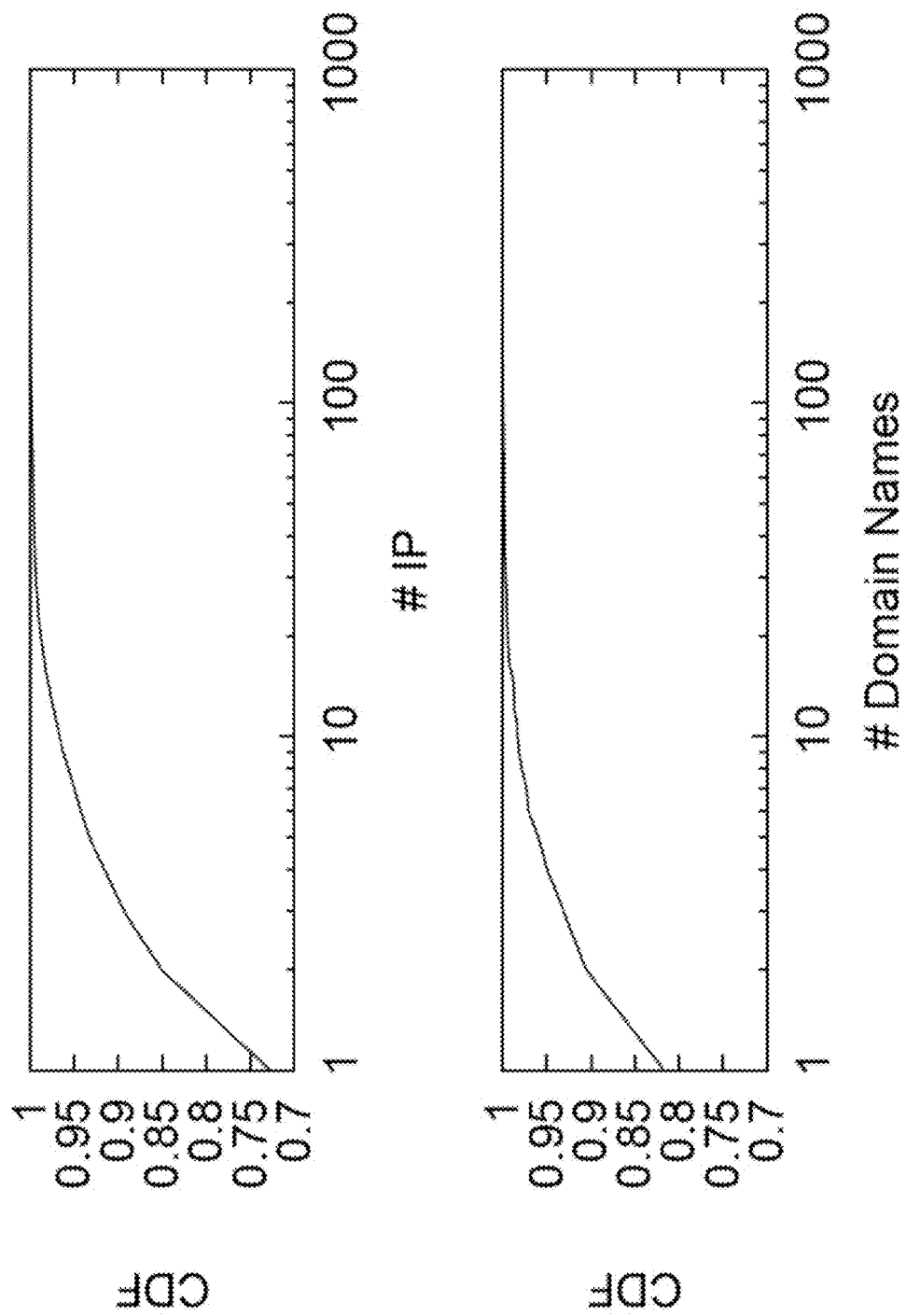
Figure 3E:
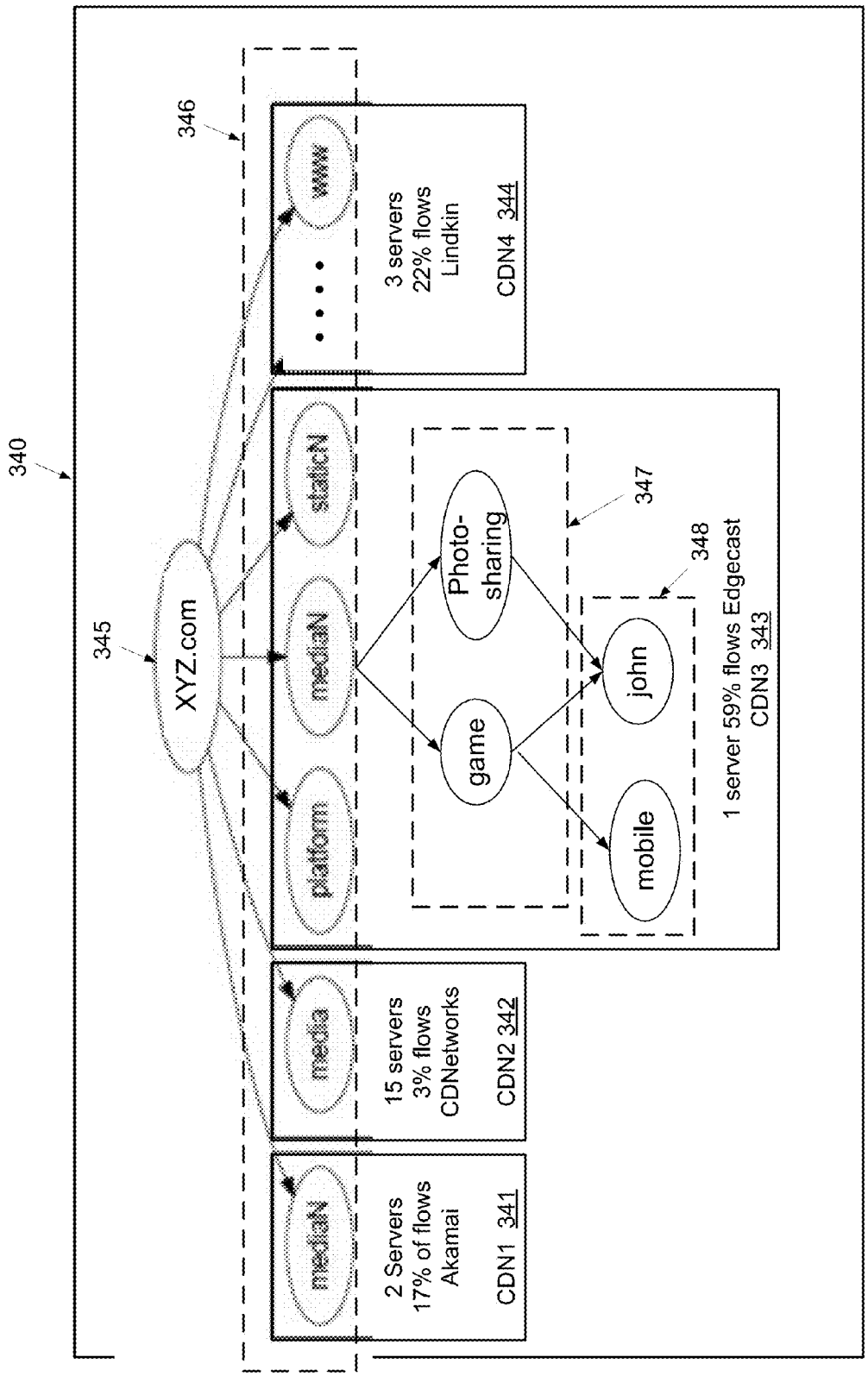

FIG. 3C shows, for the example dataset 1 through 5, the CDF (represented by Y-axis) of the time (represented by X-axis) elapsed between the DNS response and any further TCP flow the client establishes with any of the server IP addresses offered in the answer list returned in the DNS response. It reflects the impact of caching lifetime at the local DNS resolver at clients. The initial part of the CDF is strictly related to the first flow delay shown in FIG. 3B; subsequent flows directed to the same FQDN exhibit larger time gaps. Results show that the local resolver caching lifetime can be up to few hours. Thus, to resolve about 98% of flows for which a DNS querys is seen, DNS resolver cache (e.g., Clist (301) of FIG. 3A) must handle an equivalent caching time of 1 hour. In an example based on one of the aforementioned dataset, approximately 350,000 DNS querys are observed every 10 m during peak time. In this scenario, considering a desired caching time of 1h, the size of Clist (301) should be about 2.1M entries to guarantee a DNS resolver efficiency of 98% (i.e., 98% of flows can be tagged in real time). In addition, since any of the server IP addresses included in the DNS response can be selected by the client IP to open possible TCP flows, all addresses returned by the DNS server in the response must be stored in DNS resolver. Based on the example dataset above, around 40% of responses return more than one Server IP address. About 20-25% of responses include from 2 to 10 different addresses. Most of these are related to servers managed by large CDNs and organizations. For example, 5 or 16 server IPs are typically returned when querying any Google FQDN. The maximum number exceeds 30 in a few cases.

TABLE 6

| Port | DNS Labels |
|---|---|
| 25 | (91)smtp, (37)mail, (22)mxN, (19)mailN, (18)com, (17)altn, (14)mailin, (13)aspmx, (13)gmail |
| 21 | (15)ftp, (2)enrico, (2)download |
| 80 | (2856)www, (1412)static, (1159)photos, (1130)profile, (909)secure, (716)ads, (715)images, (705)emea, (650)cdn |
| 110 | (240)pop, (151)mail, (68)popM, (33)mailbus |
| 143 | (25)imap, (22)mail, (12)pop, (3)apple |
| 443 | (702)www, (464)urs, (356)login, (249)secure, (241)mail, (174)ssl, (165)update, (109)static, (96)google, (73)data |
| 554 | (1)streaming |
| 587 | (10)smtp, (3)pop, (1)imap |
| 995 | (101)pop, (37)popN, (31)mail, (20)glbdns (20)hot, (17)pec |
| 1863 | (21)messenger, (5)relay, (5)edge, (5)voice, (2)msn, (2)com, (2)emea |

TABLE 6 shows DNS labels (i.e., FQDN labels) extracted from an example dataset for various well-known L4 ports (i.e., well known server ports). Scores are listed in brackets each representing a measure of popularity (e.g., frequency of occurrences on a relative scale) of the corresponding DNS label occurring in tagged flows. Results shown in TABLE 6 clearly confirm that the labels in FQDNs assigned to servers handling some specific service reflect service associated with these well-known ports. Such results are presented to an administrator user for making network management decisions. For example, by looking at TCP port 25 and the key words associated with it, an administrator may see that the predominant service on the port is SMTP. Similarly TCP port 21 is FTP. TCP port 995 is running POP3 service. TCP port 1863 is a messenger service, etc. Accordingly, the administrator may optimize the network configuration for the predominant service traffic. In one or more embodiments, information included in TABLE 6 may be presented to the user as an electronic report in a text file, as a printed paper report, or displayed as a diagram on a display device. Even if some DNS labels in TABLE 6 are not meaningful, it is still useful for the user to identify service running on the targeted port. For example, TCP port 1863 is most likely running "msn messenger". It is easy to spot this when the administrator user has visibility into all the key words. Notice also how scores help in weighting the choice. The user has the choice to determine what is the best way to interpret the weighted terms. For example, for port 21, the tag "enrico" and "ftp" are each assigned a score of 2 and 15, respectively. Because the term "ftp" has a much higher weight compared to "enrico," the operator can determine that the service is "ftp".

TABLE 7

| Port | DNS Labels |
| --- | --- |
| 1080 | (51)opera, (51)miniN |
| 1337 | (83)exodus, (41)genesis |
| 2710 | (62)tracker, (9)www |
| 5050 | (137)msg, (137)webcs, (58)sip, (43)voipa |
| 5190 | (27)americaonline |
| 5222 | (1170)chat |
| 5223 | (191)courier, (191)push |
| 5228 | (15022)mtalk |
| 6969 | (88)tracker, (19)trackerN, (11)torrent, (10)exodus |
| 12043 | (32)simN, (32)agni |
| 12046 | (20)simN, (20)agni |
| 18182 | (92)useful, (88)broker |

TABLE 7 shows DNS labels extracted from an example dataset for various L4 ports that are not well-known ports. Scores are listed in brackets each representing a measure of popularity (e.g., frequency of occurrences on a relative scale) of the corresponding DNS label occurring in the tagged flows. Since these are not well-known ports and are not conventionally associated with particular services, the port numbers do not offer useful information to define services running on them. For example, searching the keyword "TCP port 1337" in a Google® search may not return useful information regarding service running on this port. However, adding the DNS labels "exodus" and "genesis" from TABLE 7 to the search keyword "TCP port 1337" in the Google® search returns information indicating that TCP port 1337 is related to the www.1337x.org BitTorrent® tracker. In summary, example results show the usefulness of the extracted DNS labels in reflecting services running on the target ports. The results shown in TABLE 7 are helpful for an administrator user to automatically discover services running on various ports of interest. For example, information included in TABLE 6 may be presented to the user as an electronic report in a text file, as a printed paper report, or displayed as a diagram.

FIGS. 3D and 3E show example results in un-tangling the convoluted relationships between services and servers in today's Internet. To show how complicated the overall scenario looks like, top plot of FIG. 3D is a plot of CDF against number of IP addresses that shows, for a particular FQDN, the overall number of IP addresses that serve the FQDN. Conversely, bottom plot of FIG. 3D is a plot of CDF against number of fully qualified domain names that shows, for a particular server IP address, the number of different FQDNs served by the single server IP. For example, one single server IP is associated to a single FQDN for 73% of cases, while 82% of FQDNs maps to just one server IP. However, the distributions in these plots show that many FQDNs are served by hundreds of different server IP addresses. The number of FQDNs served by one server IP may even be larger. Notice the log scale on X-axis. Based on an example dataset, 290,000 distinct FQDN were observed in 5 h.

FIG. 3E shows an example screenshot (340), based on an example dataset consistent with the scenario of FIG. 3D, that may be presented to a network administrator user to show how the Linkedin® service is served. In the example screenshot (340), oval nodes represent DNS labels extracted from the FQDNs, while arrows connect the labels to reconstruct the FQDN. For example, oval nodes (346), (347), and (348) represent DNS labels extracted from different levels of sub-domain names. Numbers are substituted by a generic N letter. Squared nodes group labels by organization (e.g., CDN), as provided by the MaxMind Organization Database. For example, from the leftmost branch (i.e., oval(s) and square node(s) connected by arrow(s)), mediaN.linkedin.com (N is one of several integers observed in the example dataset) represents all FQDNs served by CDN 1 (341) (e.g., Akamai®). The total number of Server IP addresses, the fraction of served flows, and/or name of the organization operating the servers are reported in the example screenshot (340) for each organization.

Based on the example screenshot (340), the information helps the administrator user to understand that Linkedin® relies on service offered by several CDN providers. The www.linkedin.com (plus 7 more FQDN) are served by Linkedin® managed servers. Other static content is scattered over three CDNs, Akamai® shown in CND1 (341), CDNetwork shown in CDN2 (342), and Edgecast® shoWn in CDN3 (343). The latter serves 59% of flows with a single IP address. Akamai® on the contrary, served only 3% of flows with 15 different server IP addresses. In another example, the information contained in the example screenshot (340) may also be presented to the user in an electronic report or a printed report.

Although specific formats or structures are used as examples in the foregoing description regarding the flows, the captured payloads, the signature terms, filtering layer/qualification loop structures, etc., one skilled in the art, with the benefit of this disclosure, will recognize that other formats or structures may also be used in the system and methods described without deviating from the spirit of the invention.

Figure 4:
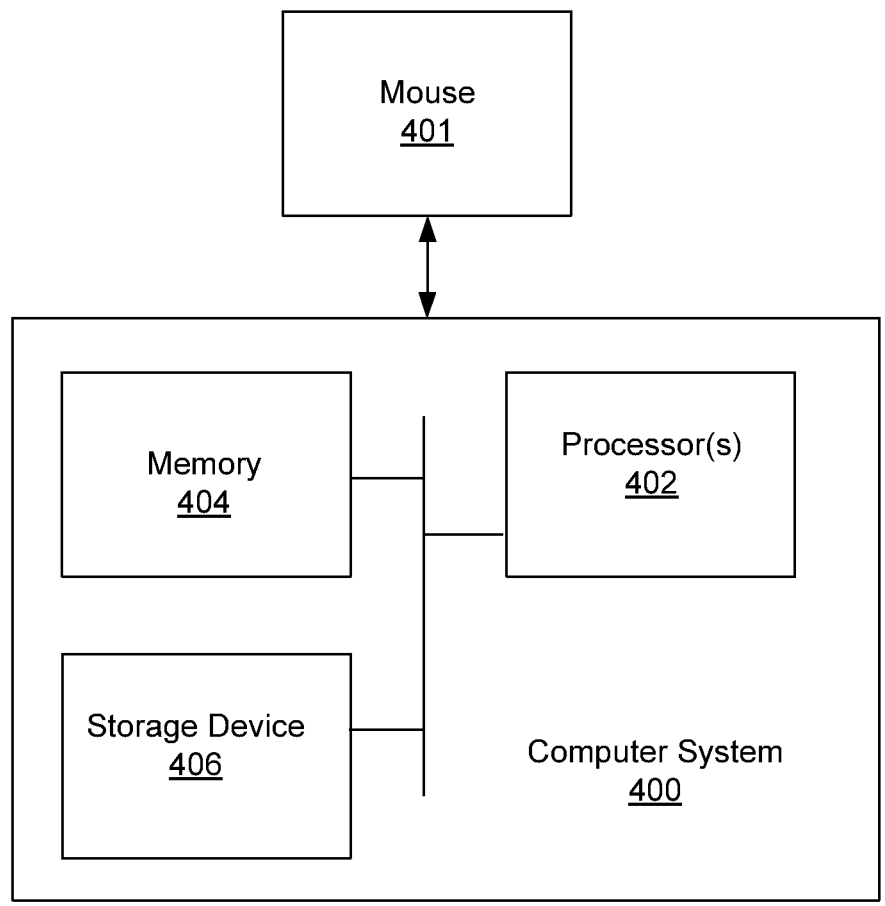
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for profiling network traffic of a network, comprising:
    obtaining, by a processor of a computer system and from the network traffic, a plurality of domain name service (DNS) flows comprising a plurality of client Internet protocol (IP) addresses, a plurality of fully qualified domain names (FQDNs), and a plurality of server IP addresses,
    wherein the plurality of DNS flows comprise a DNS query that is initiated from a client IP address of the plurality of client IP addresses to request service based on a FQDN of the plurality of FQDNs that is contained in the DNS query, and
    wherein the plurality of server IP addresses comprise a server IP address that is resolved by a DNS server in the network based on the FQDN as requested from the client IP address and returned in a DNS response contained in the plurality of DNS flows;
    analyzing, by the processor, the plurality of DNS flows to generate a mapping between the plurality of client IP addresses, the plurality of server IP addresses, and the plurality of FQDNs;
    storing the mapping in a data structure separate from the DNS server, wherein each of the plurality of client IP addresses and each of the plurality of server IP addresses form a client/server IP address pair that is used as input to the data structure for looking up one of the plurality of FQDNs as output of the data structure; and
    analyzing the network traffic based on the data structure to generate a result of profiling the network traffic, wherein analyzing the network traffic based on the data structure comprises:
    obtaining, from the network traffic, a plurality of flows comprising a first portion of the plurality of client IP addresses, a second portion of the plurality of server IP addresses, and a plurality of server ports;
    tagging the plurality of flows using corresponding FQDNs that are looked up using the data structure based on the first portion of the plurality of client IP addresses and the second portion of the plurality of server IP addresses contained in the plurality of flows;
    storing the plurality of flows in association with the corresponding FQDNs in a repository as a plurality of tagged flows; and
    tallying a plurality of portions of the plurality of tagged flows to generate a plurality of tallies,
    wherein at least one portion of the plurality of portions is defined based on a common FQDN among the plurality of FQDNs and a common server port among the plurality of server ports that are shared by all flows in the at least one portion, and
    wherein the result comprises the plurality of tallies.

2. The method of claim 1,
    wherein at least two of the plurality of server IP addresses are resolved by the DNS server to provide service based on the FQDN as requested from the plurality of client IP addresses, and
    wherein the server IP address is resolved by the DNS server to provide service based on any of at least two of the plurality of FQDNs as requested from the plurality of client IP addresses.

3. The method of claim 1, further comprising:
    extracting a plurality of FQDN labels from the plurality of FQDNs,
    wherein the plurality of FQDN labels are delimited by periods in the plurality of FQDNs, and
    wherein at least another one portion of the plurality of portions is defined based on a common FQDN label among the plurality of FQDN labels and another common server port among the plurality of server ports that are shared by all flows in the at least another one portion.

4. The method of claim 1,
    wherein the second portion of the plurality of server IP addresses of the plurality of flows are obtained from cached local DNS records without initiating any DNS query to the DNS server,
    wherein the cached local DNS records are originated from the DNS server, and
    wherein validity of the cached local DNS records is based on a time-to-live parameter determined by the DNS server.

5. The method of claim 1, further comprising:
    extracting, in response to the analyzing and based on the FQDN, a portion of the plurality of flows to form a training set; and
    generating a signature associated with the FQDN based on the training set,
    wherein the result comprises the signature.

6. The method of claim 1, further comprising:
storing at least one selected from a group consisting of the plurality of server IP addresses and the plurality of server ports in a database as a plurality of entries tagged by the plurality of FQDNs.

7. The method of claim 1, further comprising:
determining, in response to extracting the FQDN from the DNS response, that the FQDN is not yet stored in the data structure,
extracting the client IP address and the server IP address from the DNS query and the DNS response; and
storing, in response to determining that the FQDN is not yet stored in the data structure, the FQDN in the data structure indexed by the client IP address and the server IP address,
wherein tagging the plurality of flows using the corresponding FQDNs comprises:
determining that a flow of the plurality of flows is associated with the client IP address and the server IP address;
retrieving, in response to the determining, the FQDN from the data structure based on the client IP address and the server IP address; and
tagging, in response to the retrieving, the flow using the FQDN, and
wherein the result is generated in real time prior to completion of the flow.

8. A system for profiling network traffic of a network, comprising:
a data collector configured to:
obtain, from the network traffic, a plurality of domain name service (DNS) flows comprising a plurality of client Internet protocol (IP) addresses, a plurality of fully qualified domain names (FQDNs), and a plurality of server IP addresses,
wherein the plurality of DNS flows comprise a DNS query that is initiated from a client IP address of the plurality of client IP addresses to request service based on a FQDN of the plurality of FQDNs that is contained in the DNS query, and
wherein the plurality of server IP addresses comprise a server IP address that is resolved by a DNS server in the network based on the FQDN as requested from the client IP address and returned in a DNS response contained in the plurality of DNS flows; and
an analyzer configured to:
analyze the plurality of DNS flows to generate a mapping between the plurality of client IP addresses, the plurality of server IP addresses, and the plurality of FQDNs;
store the mapping in a data structure separate from the DNS server, wherein each of the plurality of client IP addresses and each of the plurality of server IP addresses form a client/server IP address pair that is used as input to the data structure for looking up one of the plurality of FQDNs as output of the data structure; and
analyze the network traffic based on the data structure to generate a result of profiling the network traffic, wherein analyzing the network traffic based on the data structure comprises:
obtaining, from the network traffic, a plurality of flows comprising a first portion of the plurality of client IP addresses, a second portion of the plurality of server IP addresses, and a plurality of server ports;
tagging the plurality of flows using corresponding FQDNs that are looked up using the data structure based on the first portion of the plurality of client IP addresses and the second portion of the plurality of server IP addresses contained in the plurality of flows;
storing the plurality of flows in association with the corresponding FQDNs in a repository as a plurality of tagged flows; and
tallying a plurality of portions of the plurality of tagged flows to generate a plurality of tallies,
wherein at least one portion of the plurality of portions is defined based on a common FQDN among the plurality of FQDNs and a common server port among the plurality of server ports that are shared by all flows in the at least one portion, and
wherein the result comprises the plurality of tallies.

9. The system of claim 8,
wherein at least two of the plurality of server IP addresses are resolved by the DNS server to provide service based on the FQDN as requested from the plurality of client IP addresses, and
wherein the server IP address is resolved by the DNS server to provide service based on any of at least two of the plurality of FQDNs as requested from the plurality of client IP addresses.

10. The system of claim 8, the data collector further configured to:
extract a plurality of FQDN labels from the plurality of FQDNs,
wherein the plurality of FQDN labels are delimited by periods in the plurality of FQDNs, and
wherein at least another one portion of the plurality of portions is defined based on a common FQDN label among the plurality of FQDN labels and another common server port among the plurality of server ports that are shared by all flows in the at least another one portion.

11. The system of claim 8,
wherein the second portion of the plurality of server IP addresses of the plurality of flows are obtained from cached local DNS records without initiating any DNS query to the DNS server,
wherein the cached local DNS records are originated from the DNS server, and
wherein validity of the cached local DNS records is based on a time-to-live parameter determined by the DNS server.

12. The system of claim 8, the analyzer further configured to:
extract, in response to the analyzing and based on the FQDN, a portion of the plurality of flows to form a training set; and
generate a signature associated with the FQDN based on the training set,
wherein the result comprises the signature.

13. The system of claim 8, further comprising:
a database for storing at least one selected from a group consisting of the plurality of server IP addresses and the plurality of server ports as a plurality of entries tagged by the plurality of FQDNs.

14. The system of claim 8, the data collector further configured to:
determine, in response to extracting the FQDN from the DNS response, that the FQDN is not yet stored in the data structure,
extract the client IP address and the server IP address from the DNS query and the DNS response; and
store, in response to determining that the FQDN is not yet stored in the data structure, the FQDN in the data structure indexed by the client IP address and the server IP address,
wherein tagging the plurality of flows using the corresponding FQDNs comprises:

determining that a flow of the plurality of flows is associated with the client IP address and the server IP address;

retrieving, in response to the determining, the FQDN from the data structure based on the client IP address and the server IP address; and tagging, in response to the retrieving, the flow using the FQDN, and wherein the result is generated in real time prior to completion of the flow.

15. A non-transitory computer readable medium embodying instructions for profiling network traffic of a network, the instructions when executed by a processor comprising functionality for:

obtaining, from the network traffic, a plurality of domain name service (DNS) flows comprising a plurality of client Internet protocol (IP) addresses, a plurality of fully qualified domain names (FQDNs), and a plurality of server IP addresses, wherein the plurality of DNS flows comprise a DNS query that is initiated from a client IP address of the plurality of client IP addresses to request service based on a FQDN of the plurality of FQDNs that is contained in the DNS query, and wherein the plurality of server IP addresses comprise a server IP address that is resolved by a DNS server in the network based on the FQDN as requested from the client IP address and returned in a DNS response contained in the plurality of DNS flows;

analyzing the plurality of DNS flows to generate a mapping between the plurality of client IP addresses, the plurality of server IP addresses, and the plurality of FQDNs;

storing the mapping in a data structure separate from the DNS server, wherein each of the plurality of client IP addresses and each of the plurality of server IP addresses form a client/server IP address pair that is used as input to the data structure for looking up one of the plurality of FQDNs as output of the data structure; and analyzing the network traffic based on the data structure to generate a result of profiling the network traffic, wherein analyzing the network traffic based on the data structure comprises:

obtaining, from the network traffic, a plurality of flows comprising a first portion of the plurality of client IP addresses, a second portion of the plurality of server IP addresses, and a plurality of server ports;

tagging the plurality of flows using corresponding FQDNs that are looked up using the data structure based on the first portion of the plurality of client IP addresses and the second portion of the plurality of server IP addresses contained in the plurality of flows;

storing the plurality of flows in association with the corresponding FQDNs in a repository as a plurality of tagged flows; and tallying a plurality of portions of the plurality of tagged flows to generate a plurality of tallies, wherein at least one portion of the plurality of portions is defined based on a common FQDN among the plurality of FQDNs and a common server port among the plurality of server ports that are shared by all flows in the at least one portion, and wherein the result comprises the plurality of tallies.

16. The non-transitory computer readable medium of claim 15, wherein analyzing the network traffic based on the data structure comprises:

obtaining, from the network traffic, a plurality of flows comprising a first portion of the plurality of client IP addresses, a second portion of the plurality of server IP addresses, and a plurality of server ports;

tagging the plurality of flows by corresponding FQDNs that are looked up using the data structure based on the first portion of the plurality of client IP addresses and the second portion of the plurality of server IP addresses contained in the plurality of flows;

storing the plurality of flows in association with the corresponding FQDNs in a repository as a plurality of tagged flows; and tallying a plurality of portions of the plurality of tagged flows to generate a plurality of tallies, wherein at least one portion of the plurality of portions is defined based on a common FQDN among the plurality of FQDNs and a common server port among the plurality of server ports that are shared by all flows in the at least one portion, and wherein the result comprises the plurality of tallies.

* * * * *